(12) United States Patent
Linzer et al.

(10) Patent No.: US 10,250,910 B1
(45) Date of Patent: *Apr. 2, 2019

(54) TEMPORAL FILTERING BASED ON MOTION DETECTION ON AREAS OF DIFFERENT SIZES

(71) Applicant: Ambarella, Inc., Santa Clara, CA (US)

(72) Inventors: Elliot N. Linzer, Bergenfield, NY (US); Leslie D. Kohn, Saratoga, CA (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/883,220

(22) Filed: Jan. 30, 2018

Related U.S. Application Data

(63) Continuation of application No. 14/667,950, filed on Mar. 25, 2015, now Pat. No. 9,906,814.

(60) Provisional application No. 62/097,663, filed on Dec. 30, 2014.

(51) Int. Cl.
*H04N 7/12* (2006.01)
*H04N 19/82* (2014.01)
*H04N 19/513* (2014.01)

(52) U.S. Cl.
CPC ........... *H04N 19/82* (2014.11); *H04N 19/521* (2014.11)

(58) Field of Classification Search
CPC ............................ H04N 19/82; H04N 19/521

USPC ..................................................... 375/240.16
See application file for complete search history.

(56) References Cited

U.S. PATENT DOCUMENTS

| | | | |
|---|---|---|---|
| 6,157,677 A | 12/2000 | Martens | 348/416.1 |
| 2007/0071342 A1* | 3/2007 | Bilbrey | G06T 5/20 |
| | | | 382/254 |
| 2008/0106544 A1 | 5/2008 | Lee | 345/214 |
| 2008/0199051 A1 | 8/2008 | Seo | 382/107 |
| 2009/0033800 A1 | 2/2009 | Yagi | 348/699 |
| 2010/0290530 A1 | 11/2010 | Huang | 375/240.16 |

\* cited by examiner

*Primary Examiner* — Nguyen T Truong
(74) *Attorney, Agent, or Firm* — Christopher P. Maiorana, PC

(57) ABSTRACT

A method for temporal filtering based on motion detection on areas of different sizes includes computing a plurality of motion scores of a plurality of areas in a target picture in a sequence of pictures by motion detection of the areas between the target picture and a reference picture in the sequence of pictures, where the areas may be at least two overlapping areas of different sizes, computing a combined motion score by combining the plurality of motion scores, and generating a filtered picture by temporal filtering the target picture with the reference picture based on the combined motion score. At least one of (i) the motion scores and (ii) the filtered picture may be based on one or more gain settings in a circuit.

18 Claims, 7 Drawing Sheets

TEMPORAL FILTERING BASED ON MOTION DETECTION ON AREAS OF DIFFERENT SIZES

This application relates to U.S. Ser. No. 14/667,950, filed Mar. 25, 2013, which relates to U.S. Provisional Application No. 62/097,663, filed Dec. 30, 2014, each hereby incorporated by reference in their entirety.

FIELD OF THE INVENTION

The present invention relates to video temporal filtering with motion detection generally and, more particularly, to methods and/or apparatus for temporal filtering based on motion detection on areas of different sizes.

BACKGROUND OF THE INVENTION

Conventional motion detection looks at a local error measure, commonly a sum-of-absolute-differences, between a target picture and a reference picture. Even if no motion exists, such local error measures tend to be non-zero due to noise and changes in scene lightness. Therefore, motion detection commonly detects small differences between the pictures as no motion and detects big differences as motion. Temporal filtering is used to combine a target picture with a motion compensated reference picture, and uses strong filtering where no motion is detected.

It would be desirable to implement temporal filtering based on motion detection on areas of difference sizes.

SUMMARY OF THE INVENTION

The present invention concerns a method for temporal filtering based on motion detection on areas of different sizes including computing a plurality of motion scores of a plurality of areas in a target picture in a sequence of pictures by motion detection of the areas between the target picture and a reference picture in the sequence of pictures, where the areas may be at least two overlapping areas of different sizes, computing a combined motion score by combining the plurality of motion scores, and generating a filtered picture by temporal filtering the target picture with the reference picture based on the combined motion score. At least one of (i) the motion scores and (ii) the filtered picture may be based on one or more gain settings in a circuit.

The objects, features and advantages of the present invention include providing temporal filtering based on motion detection on areas of different sizes that may (i) use motion detection between two different pairs of pictures to determine how to apply a temporal filter between a pair of the pictures, (ii) use a motion detection that covers a wide area and another motion detection that covers a small area to determine how to apply a temporal filter between the pair of the pictures, (iii) combine multiple motion detection scores to control the temporal filter and/or (iv) use motion detection between non-adjacent pictures to determine how to temporal filter between adjacent pictures.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Motion detection may be used in many applications, such as security cameras, and/or in many operations, such as motion compensated temporal filtering (e.g., MCTF) a sequence of pictures (or images). For the motion compensated temporal filtering, a filter may adaptively combine one or more reference (or previous) pictures and a target (or current) picture of the sequence based on detected motion in the target picture relative to the reference pictures. The filtering may also decide locally how to combine the multiple pictures (e.g., fields and/or frames) to reduce noise while limiting filter-created artifacts.

Typically, the filter may favor a reference picture more the more the filter determines that no motion exists in a local area relative to the reference picture. For such a filter, motion may mean motion in an absolute sense, if motion exists. In various embodiments, the reference pictures may be pre-transformed per a motion model (e.g., a process used to estimate motion between the pictures). The transformed (motion compensated) reference pictures may be subsequently combined with the target picture. For a motion compensated temporal filtering case, motion generally means motion between the motion compensated reference pictures and the target picture. For a non-motion compensated temporal filtering case, motion generally means motion between the non-compensated reference pictures and the target picture.

Figure 1:
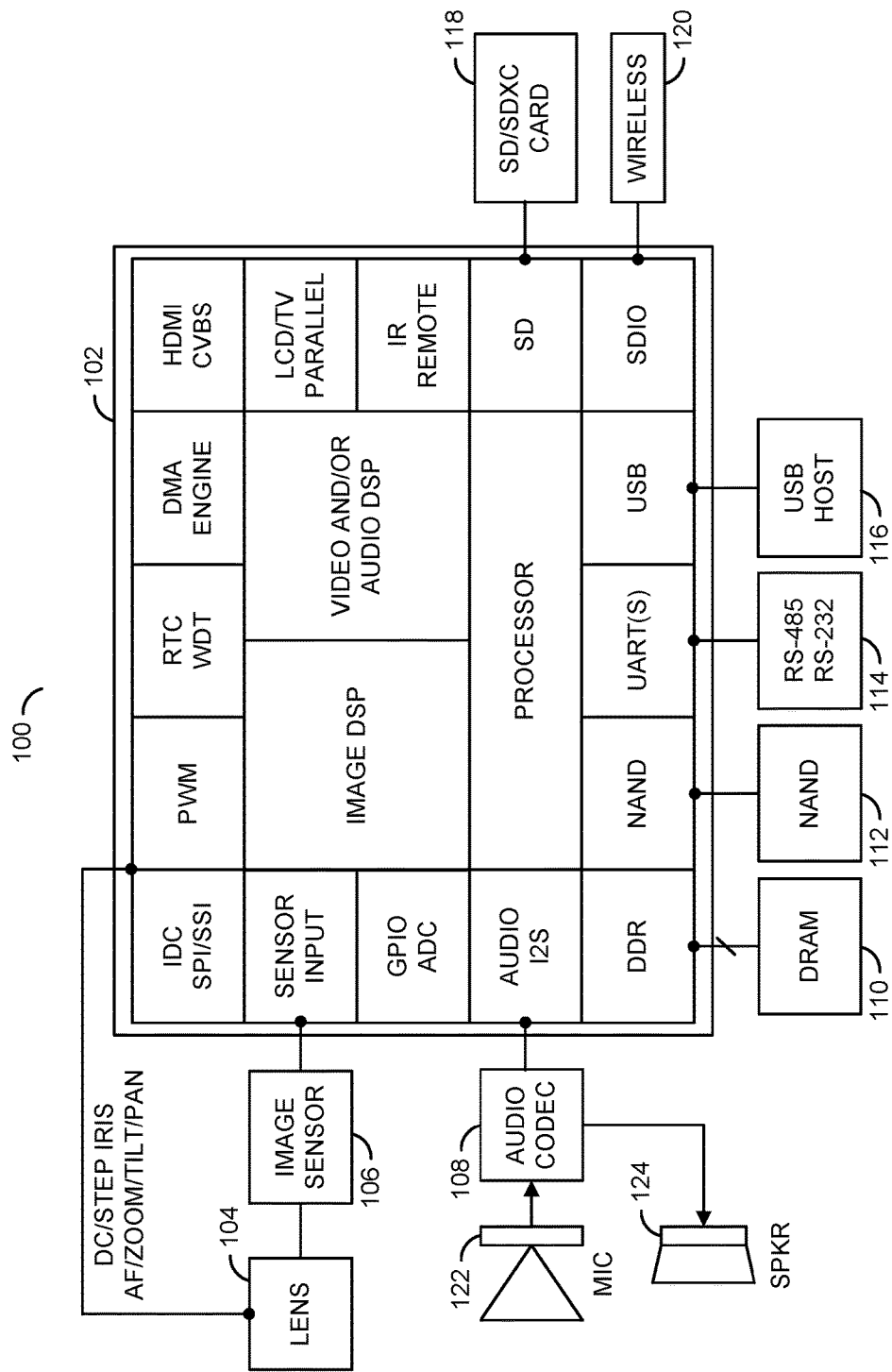
FIG. 1 is a block diagram of a camera system.

Referring to FIG. 1, a block diagram of a camera system 100 is shown illustrating an example implementation of a camera/recorder system (or apparatus). In some embodiments, the camera system 100 may be a digital video camera, a digital still camera or a hybrid digital video/still camera. In an example, the electronics of the camera system 100 may be implemented as one or more integrated circuits. For example, an application specific integrated circuit (e.g., ASIC) or system-on-a-chip (e.g., SOC) may be used to implement a processing portion of the camera system 100. In various embodiments, the camera system 100 may comprise a camera chip (or circuit) 102, a lens assembly 104, an image sensor 106, an audio codec 108, dynamic random access memory (e.g., DRAM) 110, non-volatile memory (e.g., NAND flash memory, etc.) 112, one or more serial interfaces 114, an interface 116 for connecting to or acting as a universal serial bus (e.g., USB) host, an interface for connecting to a removable media 118 (e.g., SD—secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 100 (e.g., via a video cable, a high definition media interface (e.g., HDMI) cable, a USB cable, an ethernet cable, or wireless link).

In various embodiments, the circuit 102 may comprise a number of modules (or circuits) including, but not limited to, a pulse width modulation (e.g., PWM) module, a real time clock and watchdog timer (RTC/WDT), a direct memory access (e.g., DMA) engine, a high-definition multimedia interface (e.g., HDMI), an LCD/TV/Parallel interface, a general purpose input/output (e.g., GPIO) and an analog-to-digital converter (e.g., ADC) module, an infrared (e.g., IR) remote interface, a secure digital input output (e.g., SDIO) interface module, a secure digital (e.g., SD) card interface, an audio inter-IC sound (e.g., I2S) interface, an image sensor input interface, and a synchronous data communications interface (e.g., IDC SPI/SSI). The circuit 102 may also include an embedded processor (e.g., ARM, etc.), an image digital signal processor (e.g., DSP), and a video and/or audio DSP. In embodiments incorporating the lens assembly 104 and image sensor 106 in the system 100, the circuit 102 may be configured (e.g., programmed) to control the lens assembly 104 and receive image data from the sensor 106. The wireless interface 120 may include support for wireless communication by one or more wireless protocols such as Bluetooth®, ZigBee®, Institute of Electrical and Electronics Engineering (e.g., IEEE) 802.11, IEEE 802.15, IEEE 802.15.1, IEEE 802.15.2, IEEE 802.15.3, IEEE 802.15.4, IEEE 802.15.5, and/or IEEE 802.20. The circuit 102 may also include support for communicating using one or more of the universal serial bus protocols (e.g., USB 1.0, 2.0, 3.0, etc.). The circuit 102 may also be configured to be powered via the USB connection. However, other communication and/or power interfaces may be implemented accordingly to meet the design criteria of a particular implementation.

In various embodiments, programming code (e.g., executable instructions for controlling various processors of the circuit 102) implementing a temporal filter with noise-robust and/or slow-motion robust motion detection may be stored in one or more of the memories 110 and 112. When executed by the circuit 102, the programming code generally causes the circuit 102 to receive a sequence of pictures from the sensor 106, temporal filter based on measurements if an area is stationary for several pictures, temporal filtering based on motion detection on small and big areas, temporal filter based on comparing down-sampled pictures, and/or temporal filtering of adjacent pictures based on motion detection of non-adjacent pictures.

For noisy image sequences, the differences between pictures, even in stationary areas, may be large since the noise in each picture is different. Moreover, slow motion tends to add only small amounts to motion scores. Therefore, conventional motion detection may fail to correctly detect slow motion and/or motion in noisy sequences of pictures. False positives (e.g., detecting motion where none exists) may result in too-noisy output pictures. False negatives (e.g., not detecting actual motion) may result in temporal artifacts. Various embodiments of the present invention generally contain one or more of the following features that may be used individually or in combination to make temporal filtering based on motion compensation more robust.

Motion detection may be based on observing if the video is stationary or moving for several pictures (or frames or fields). Specifically, for the same location, scores are generally used from multiple picture comparisons. By incorporating extra data into the still or moving decision, the detection may be more robust.

Temporal filtering is generally based on motion detection on areas of different sizes (e.g., small areas and wide areas). Scores computed over still (e.g., non-moving) wide areas may vary less than scores computed over still small areas (e.g., small relative to the wide areas) due to noise because of the law of large numbers. However, such scores may not precisely delineate which part of the picture is moving. Using small scores and large scores may gain added robustness with respect to noise while maintaining higher precision in the location of the motion.

Temporal filtering of adjacent pictures may be based on motion detection of non-adjacent pictures. Adjacent pictures may be combined with a temporal filtering because adjacent pictures are generally more similar to each other than non-adjacent pictures. For slow motion, non-adjacent pictures may exhibit greater motion and, therefore, may exhibit higher motion scores than adjacent pictures. Performing detection on non-adjacent pictures (e.g., a target picture and a non-adjacent reference picture) may provide a more robust detection of slow motion, especially in the presence of noise.

Figure 2:
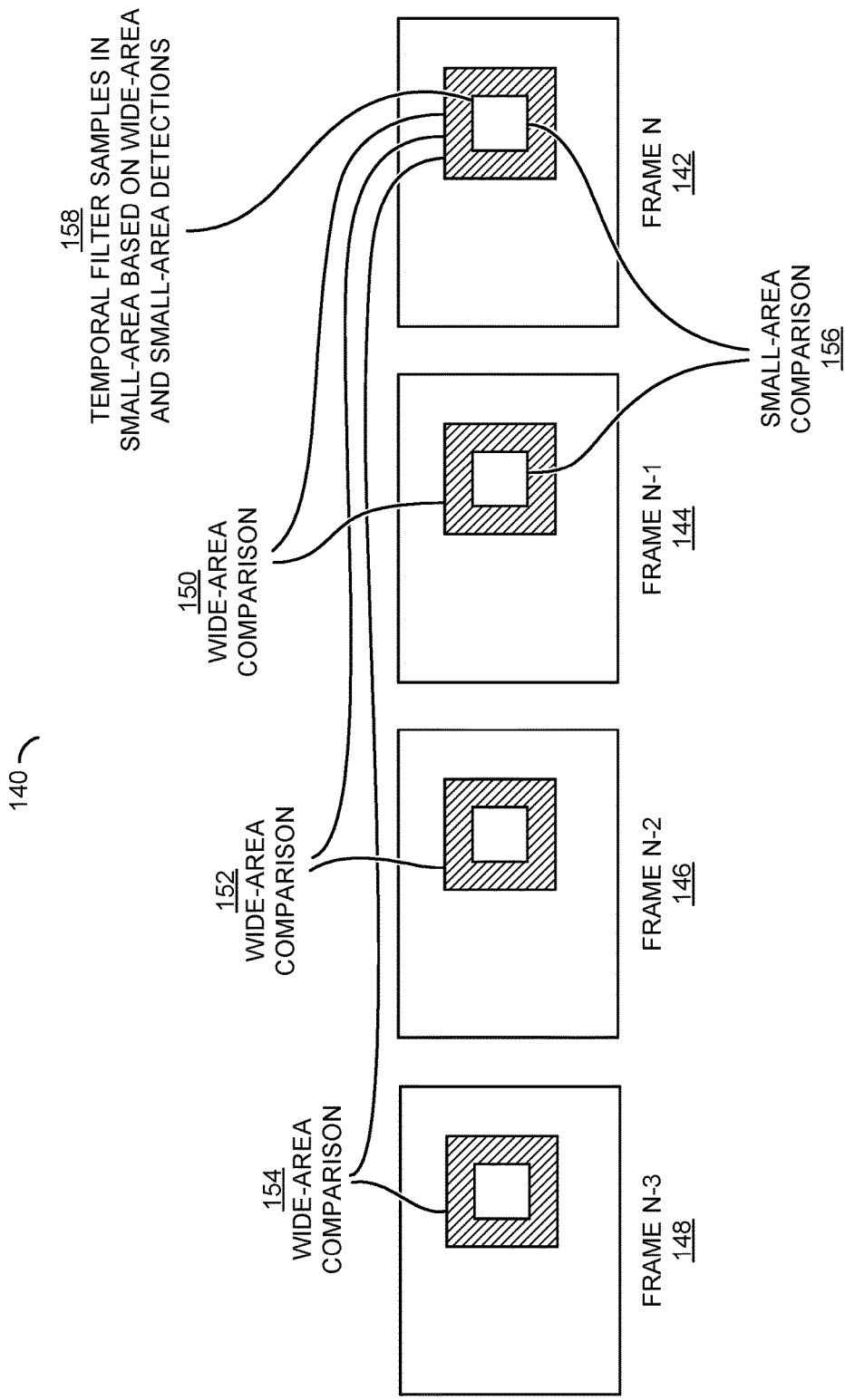
FIG. 2 is a graphical representation of several motion detections.

Referring to FIG. 2, a graphical representation 140 of several motion detections is shown. Consider a sequence of several frames N to N−3 (e.g., reference numbers 142 to 148). Motion detections may be performed between frames N to N−3 (142-148) using different sizes and/or shapes of areas. An initial wide-area motion detection 150 generally compares a wide area (shaded areas in the frames 142-148) in the frame N (142) and the co-located wide area the frame N−1 (144). Another wide-area motion detection 152 may be performed between the wide areas in the frame N (142) and the frame N−2 (146). Still another wide-area motion detection 154 of the wide area may be performed between the frame N (142) and the frame N−3 (148). A small-area motion detection 156 may compare a small area (white areas inside the shaded areas) in the frame N (142) and a co-located small area in the frame N−1 (144). Temporal filtering 158 may be performed on one or more samples in the small area of the frame N (142) based on both the wide-area motion detections 150-154 and the small-area motion detection 156.

The wide areas generally cover more area (or more samples) of the pictures 142-148 than the small areas. For example, the wide areas may be 8×8 samples, 16×16 samples, 32×32 samples, or 64×64 samples. The small areas may be 7×7 samples, 5×5 samples, 3×3 samples or a single sample. Shapes other than square may be implemented for the wide areas and/or the small areas. For example, the wide areas may be diamond shaped or rectangular shaped (e.g., 16×8 samples). The small areas may be rectangular shaped (e.g., 3×1 samples). Other sizes and shapes may be implemented to meet the criteria of a particular application.

Figure 3:
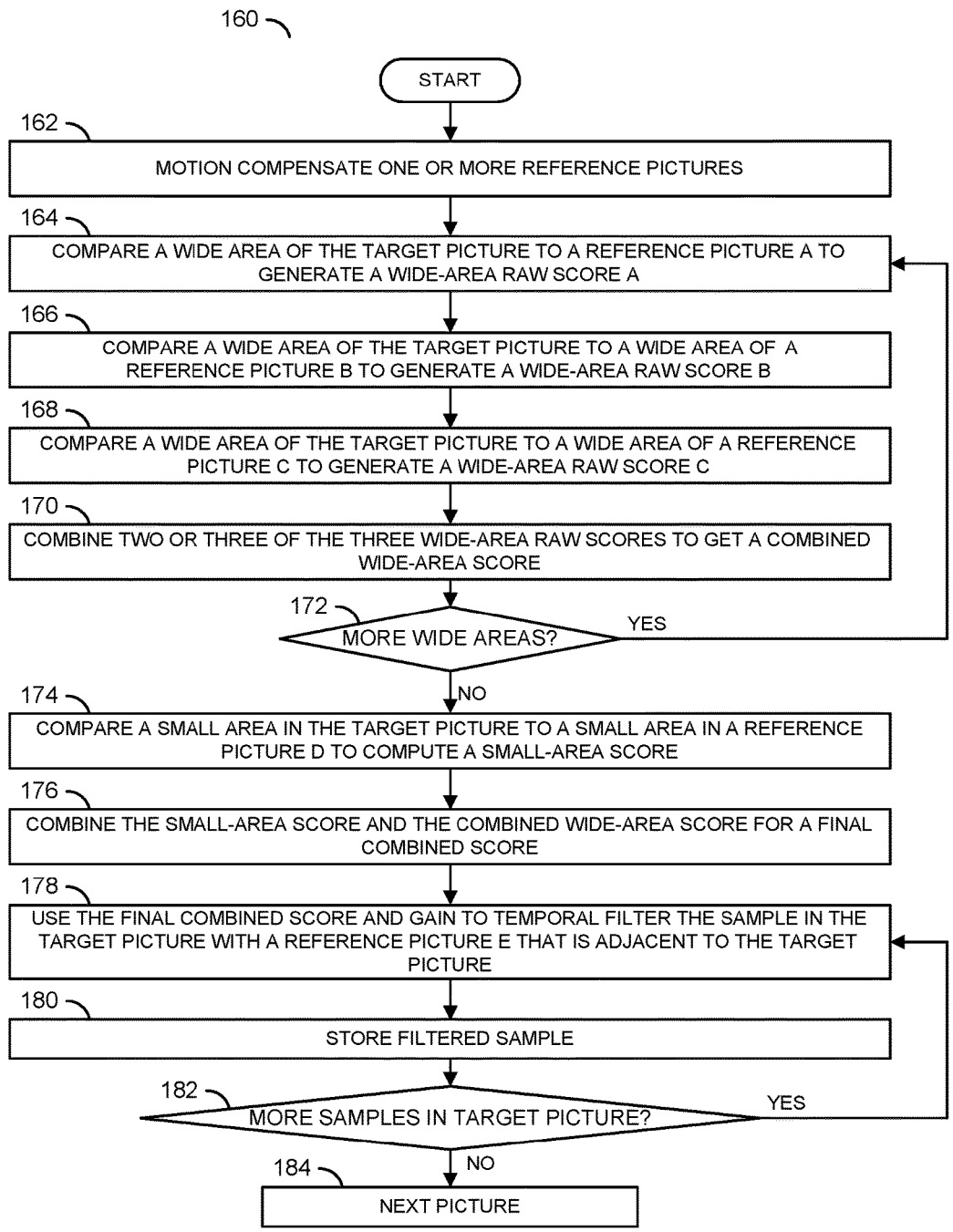
FIG. 3 is a flow diagram of a motion detection method in accordance with a preferred embodiment of the present invention.

Referring to FIG. 3, a flow diagram of a motion detection method 160 is shown in accordance with a preferred embodiment of the present invention. The method (or process) 160 may be performed by the circuit 102. The method 160 generally comprises a step (or state) 162, a step (or state) 164, a step (or state) 166, a step (or state) 168, a step (or state) 170, a decision step (or state) 172, a step (or state) 174, a step (or state) 176, a step (or state) 178, a step (or state) 180, a decision step (or state) 182 and a step (or state) 184. The steps 162-184 may be implemented in hardware, software, firmware or any combination thereof in an apparatus (or circuit or device). The sequence of the steps is shown as a representative example. Other step orders may be implemented to meet the criteria of a particular application.

In the step 162, the circuit 102 may motion compensate one or more reference pictures (e.g., the frames N−1, N−2, N−3, etc.). In certain applications, such as where the camera is known to be stationary, the step 162 may be skipped and non-motion-compensated reference pictures may be used in subsequent steps. The circuit 102 may compare a wide area of the target picture (e.g., the frame N) to a spatially co-located area of a reference picture A (e.g., the frame N−1) in the step 164 to generate a wide-area raw score A (e.g., a target motion score). In some embodiments, the reference picture A may not be temporally adjacent to the target picture N (e.g., the reference picture A may be the frame N−2). In other embodiments, the reference picture A may be temporally adjacent to the target picture N. In the step 166, the wide area of the target picture N may be compared with the spatially co-located wide area of another reference picture B (e.g., the frame N−2) to generate another wide-area raw score B (e.g., an additional motion score). The wide area of the target picture N may be compared in the step 168 to the spatially co-located wide area of a reference picture C (e.g., the frame N−3) to generate a wide-area raw score C (e.g., another motion score). The circuit 102 may combine two or three of the three wide-area raw scores A, B and/or C in the step 170 to generate a combined wide-area score. The decision step 172 generally determines if additional detections may be useful in one or more additional wide areas. If the additional detections may be useful, the steps 164-170 may be repeated.

The step 174 may compare a small area in the target picture N to a small area in a reference picture D to compute a small-area score. In various embodiments, the reference picture D (e.g., frame N−1 or N+1) may be temporally adjacent to the target picture N. The step 176 may combine the small-area score with the combined wide-area score to generate a final combined score. In the step 178, the circuit 102 may use the final combined score and a gain value, applied by the circuits 102 and/or 106, to temporal filter a target sample in the small area of the target picture N with another reference picture E. The reference picture E (e.g., frame N−1 or N+1) may be temporally adjacent to the target picture N. In the step 180, the filtered target sample may be stored in one or more of the memories (e.g., the memory 110).

A check may be performed in the decision step 182 to determine if any more target samples exist in the current target picture N. If more target samples have yet to be processed, the method 160 may move to the next unprocessed target sample and return to the temporal filter process (e.g., the step 178). Once all of the target samples in the current target picture N have been processed, the method 160 may continue in the step 184 with the target samples in the next picture.

The gain settings in the camera system 100 may include an analog gain and/or a digital gain in the image sensor 106, and/or a digital gain in the circuit 102. One or more of such settings may be considered in the temporal filtering. Furthermore, offset settings, exposure settings and/or aperture settings may also be considered in the temporal filtering. The circuit 102 generally controls the lens assembly 104 and/or the image sensor 106 for an automatic exposure operation. Changes in the automatic exposure may change the light levels in the image data received from the sensor 106. The gain settings affect the noise in pictures; therefore, any of the steps computing the various scores (e.g., the steps 164, 166, 168 and/or 174), combining the scores (e.g., the steps 170 and/or 176), and/or using the scores for temporal filtering (e.g., the step 178) may be controlled based on the gain settings, offset settings, exposure settings and/or aperture settings.

The scores computed in the steps 164, 166, 168 and/or 174 may be any score that is generally higher when motion exists between pictures. The scores may include, but are not limited to, sum-of-absolute-differences and sum-of-squared-differences. The scores may further be modified based on tone (e.g., brightness and/or color) as described in co-pending U.S. patent application Ser. No. 14/580,867, filed Dec. 23, 2014, which is hereby incorporated by reference in its entirety.

Figure 5:
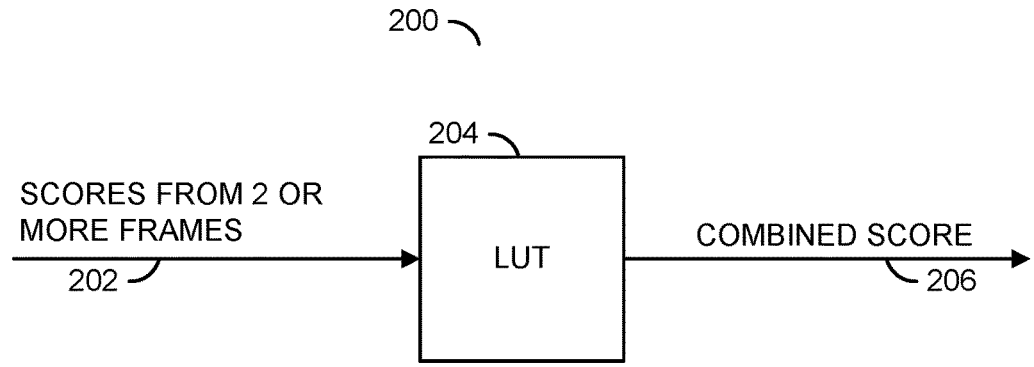
FIG. 5 is a diagram of a score combination by lookup.
Figure 6:
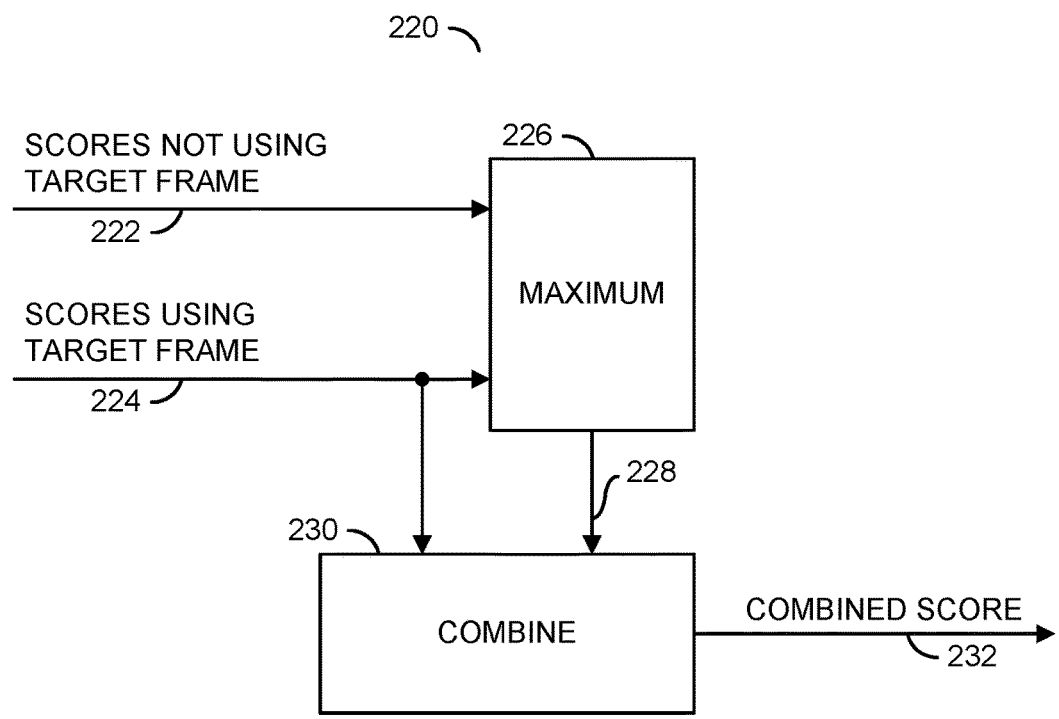
FIG. 6 is a diagram of a score combination using maximum and two-dimensional combining.
Figure 8:
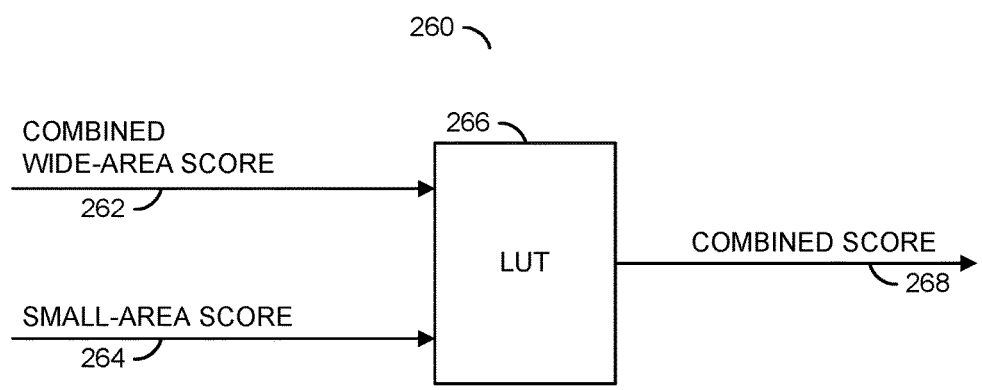
FIG. 8 is a diagram for combining a small-area score and combined wide-area score with a lookup table.

The steps 164-168 generally show three picture comparisons. In general, more or fewer picture comparisons may be implemented to meet the criteria of a particular application. The combining operations may use lookup tables and/or mathematical transformations to generate the combined motion scores. The step 170 generally shows combining two or more scores from different pictures. FIGS. 5, 6 and 8 may illustrate embodiments of various combination operations. Other comparisons between the target frame N (142) and the reference frames may be implemented.

Figure 4:
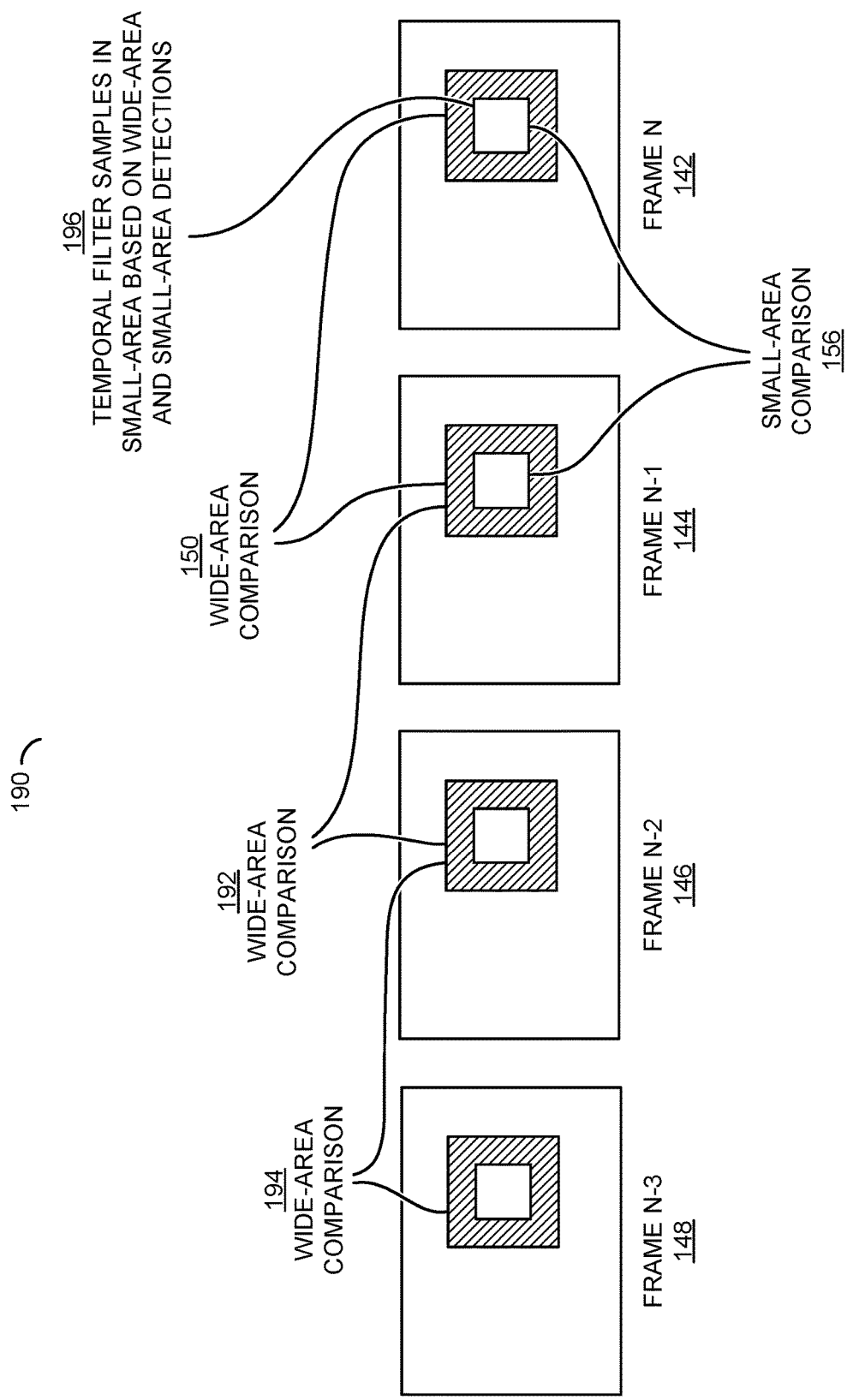
FIG. 4 is another graphical representation of several motion detections.

Referring to FIG. 4, a graphical representation 190 of several motion detections is shown. Consider the sequence of multiple frames N to N−3. As in the representation 140, the motion detection 150 generally detects wide-area motion between the target frame N (142) and the reference frame N−1 (144). The detected motion may establish (e.g., the step 164 in FIG. 3) the wide-area raw score A. Another motion detection 192 may detect wide-area motion between the reference frame N−1 (144) and the reference frame N−2 (146) to calculate the wide-area raw score B. The motion detection 192 may be a variation of the step 166. In various embodiments, a motion detection 194 may detect wide-area motion between the reference frame N−2 (146) and the reference frame N−3 (148) to calculate the raw score C. The motion detection 194 may be a variation of the step 168. In some embodiments, the motion detection 194 may be between the target frame N (142) and the reference frame N−3 (148). In other embodiments, the motion detection 194 may be between two of the reference frames (e.g., between the reference frame N−3 and a reference frame N−4).

The step 170 may combine two or three of the wide-area raw scores A, B and/or C to calculate the combined wide-area score. The circuit 102 may combine the combined wide-area score and the small-area score to generate the final combined score in the step 176. The final combined score and the gain value may be used by the circuit 102 in the step 178 to temporal filter a target sample in the area of the target picture N with the reference picture E. The reference picture E (e.g., frame N−1 or N+1) may be temporally adjacent to the target picture N. In the step 180, the filtered target sample may be stored in one or more of the memories (e.g., the memory 110). Thereafter, additional target samples and additional target pictures may be filtered.

Referring to FIG. 5, a diagram of an example score combination 200 by lookup table is shown. A signal 202 may carry the wide-area scores from two or more frames to a multi-dimensional lookup table (e.g., LUT) 204. An entry (or value) stored in the LUT 204 at an index formed by the wide-area scores may be presented from the LUT 204 as the combined wide-area score in a signal 206.

Referring to FIG. 6, a diagram of an example score combination circuit (or module) 220 using maximum selection and two-dimensional combining is shown. The scores that do not use the target frame N may be received via a signal 222 by a maximum circuit (or module) 226. The scores that use the target frame N may be received by the maximum circuit 226 and a combine circuit (or module) 230 via a signal 224. The circuit 226 is generally operational to select a maximum score (or value) among the received scores. The maximum score may be passed in a signal 228 to the circuit 230. The circuit 230 is generally operational to perform a two-dimensional lookup or mathematical operations on the scores received in the signals 224 and 228 to generate and present a combined score in a signal 232.

Various embodiments of the circuit 230 may implement a two-dimensional (e.g., a dimension for the signal 224 and another dimension for the signal 228) lookup. Other embodiments of the circuit 230 generally select the highest score in the signal 228. Some embodiments of the circuit 230 may transform the maximum score per formula 1 as follows:

$$\text{Combined\_score}=((\text{Max\_score}-\text{SUB})\times \text{MUL}) \qquad (1)$$

Where a subtraction value SUB and a multiplication value MUL may be controllable parameters, and where a value Max_score may be the maximum score in the signal 228. Still other embodiments may transform the maximum score with the score in the signal 224 as follows:

If(Max_score<THR) Combined_score=0;
else {
　A=(CUR−SUB)×MUL)
　Combined score=max(Min_score,A)
}

Where a threshold THR, a minimum score Min_score, the subtraction value SUB and the multiplication value MUL may be controllable parameters. A current value CUR may be the score that uses the target picture N in the signal 224. The temporal filtering may combine the target picture N and a reference picture using a blending curve.

Figure 7:
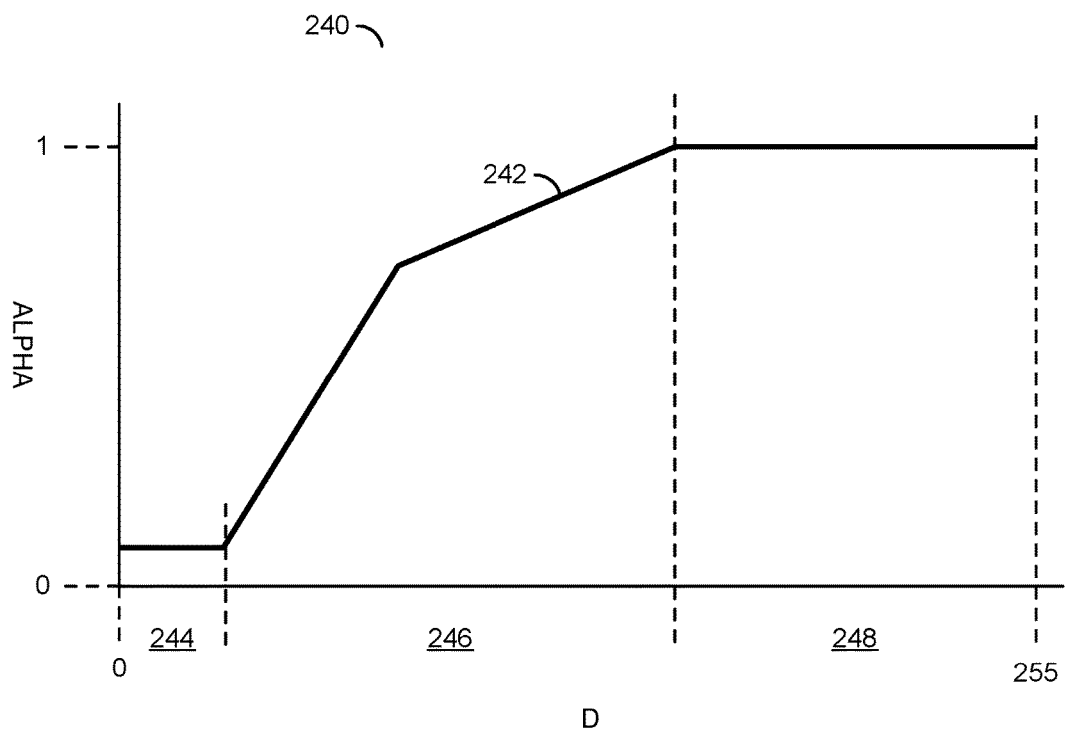
FIG. 7 is a diagram of a blending curve.

Referring to FIG. 7, a diagram 240 of an example blending curve 242 is shown. A strength of the temporal filtering (or blending) may be a continuum for one or more filter strengths. The diagram 240 generally illustrates a range of medium filter strengths and fixed filter strengths. A degree of filtering may depend on the blending curve 242.

An example of blending is generally determined as follows:
T=target (current) sample;
R=reference (previous) sample;
D=detected motion score; and
Alpha (curve 242)=lookup of the value D.
A filtered result (sample) may be calculated by formula 2 as follows:

$$\text{Result}=(\text{Alpha}\times T)+((1-\text{Alpha})\times R) \qquad (2)$$

In the diagram 240, the X axis generally represents the detected motion value D (e.g., the small-area score or the final combined motion score of the target frame N). For 8-bit levels of detected motion, the X axis is generally labeled from 0 to 255. The Y axis generally represents an alpha value (or transformed motion score) and ranges from 0 (zero) to 1 (unity). Other ranges of D and alpha may be implemented to meet the criteria of a particular application. Other techniques for determining the value D may also be implemented, such as considering several target samples simultaneously.

Small detected motion values D may be illustrated in the section 244. The section 244 generally results in a low value of alpha per the blending curve 242. Medium (or intermediate) detected motion values D may be illustrated in the section 246. The section 246 generally results in a range of values for alpha per the blending curve 242. Large detected motion values of D may be illustrated in the section 248. The section 248 generally results in a high value of alpha per the blending curve 242.

Where slow or no motion is detected, the value D is small and in the section 244. Therefore, the value alpha may be small (and optionally a fixed value). Per formula 2, the small value alpha generally weights the blending to favor the reference sample, or in some cases (e.g., alpha=0.5) averages the reference sample with the target sample. Such blending may be considered a strong filtering. Where medium motion is detected, the value D may be medium and in the section 246. Thus, the value alpha may be medium. Per formula 2, the medium value alpha variably weights the blending between the target sample and the reference sample, depending on the level of motion. Such blending may be considered a medium filtering. Where fast motion is detected, the value D may be large and in the section 248. Therefore, the value alpha may be large and weights the blending to favor the target sample. Such blending is generally considered a weak filtering. Where the value alpha=1, no filtering is accomplished and the target sample is unchanged.

In various embodiments, the blending curve 242 may be implemented as one or more LUTs. For example, a single LUT (e.g., LUT 204) may store all points of the blending curve 242. The value D may be implemented as the final combined score value or the small-area score value.

In other embodiments, different LUTs may store different blending curves and/or different portions of one or more blending curves. Selection of a particular LUT is generally based on a wide-area score (e.g., the wide-area raw score A value or the combined wide-area score value). For example, if the combined wide-area score is zero, an LUT number 0 may be utilized. If the combined wide-area score is greater than zero and less than a threshold T1, an LUT number 1 may be utilized. If the combined wide-area score is greater than the threshold T1 and less than a threshold T2, an LUT number 2 may be utilized. If the combined wide-area score is greater than the threshold T2, an LUT number 3 is generally utilized. Other numbers of LUTs may be implemented to meet the criteria of a particular application.

In some embodiments, the wide-area raw score A value or the combined wide-area score may be a lookup table number. The number of LUTs may be clamped per formula 3 as follows to a maximum value to avoid having too many LUTs:

$$\text{Table}=\min(\text{wide-area score},\text{number of tables}-1) \qquad (3)$$

In various embodiments, the wide-area raw score A value or the combined wide-area score value may be used to scale the value D received by the curve 242 or the LUT 204. The scaling may be implemented per formula 4 as follows:

$$D\_used=D\_before\_multiplication \times \text{wide-area score} \qquad (4)$$

In other embodiments, the wide-area raw score A value or the combined wide-area score value may be used to offset the value D received by the curve 242 or the LUT 204. The offsetting may be implemented per formula 5 as follows:

$$D\_used=D\_before\ offset+\text{wide-area score} \qquad (5)$$

In various embodiments, the combined wide-area score may be used to determine the alpha curve (or table) by selecting from a number of alpha curves (or tables). In some embodiments, the selection may be performed by directly using the combined wide-area score. Directly using the combined wide-area score may be appropriate where the combined wide-area score may take on a small number of values. In other embodiments, the selection may be performed by clamping the combined wide-area score. For example, if the combined wide-area score may take on values in a range of 0-255, and three alpha tables (e.g., alpha tables 0-3) are available, the alpha table may be selected per formula 6 as follows:

$$\text{Alpha table} = \min(3, \text{combined wide-area score}) \quad (6)$$

Referring to FIG. 8, a diagram of another example score combination 260 by lookup table is shown. A lookup table 266 may be programmed to perform a two-dimensional lookup on the combined wide-area score received in a signal 262 and the small-area score received in a signal 264. An entry (or value) stored at an index formed by the wide-area score 262 and the small-area score 264 may be presented by the lookup table 266 as the final combined score in a signal 268.

Figure 9:
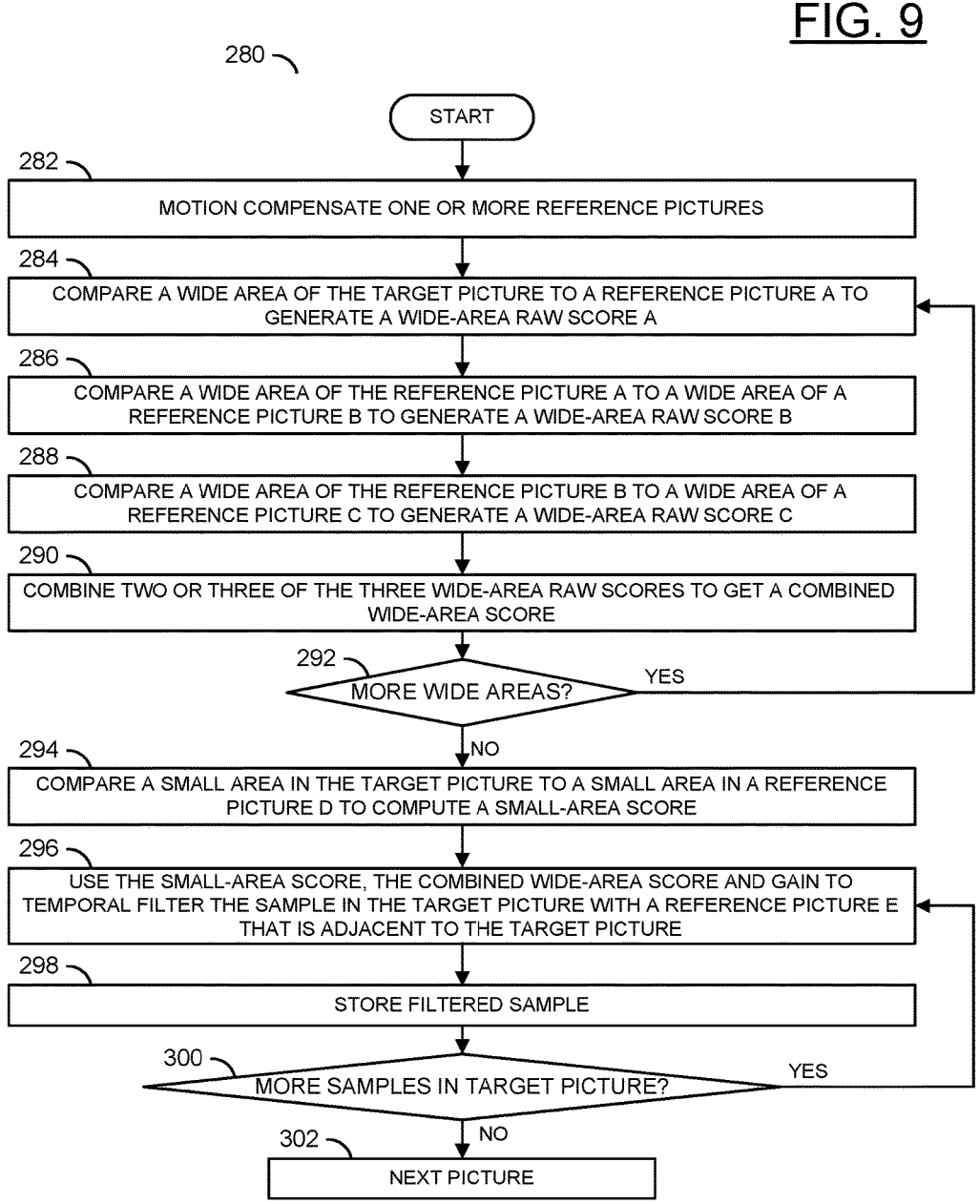
FIG. 9 is a flow diagram of another motion detection method.

Referring to FIG. 9, is a flow diagram of another motion detection method 280 is shown. The method (or process) 280 may be performed by the circuit 102. The method 280 generally comprises a step (or state) 282, a step (or state) 284, a step (or state) 286, a step (or state) 288, a step (or state) 290, a decision step (or state) 292, a step (or state) 294, a step (or state) 296, a step (or state) 298, a decision step (or state) 300 and a step (or state) 302. The steps 282-302 may be implemented in hardware, software, firmware or any combination thereof in an apparatus (or circuit or device). The sequence of the steps is shown as a representative example. Other step orders may be implemented to meet the criteria of a particular application.

The steps 282-294 and 298-302 in method 280 may be similar to the steps 162-174 and 180-184 in the method 160. The step 296 in the method 280 generally uses the combined wide-area score value, the small-area score value and the gain value to control the temporal filtering. A difference between the method 160 and the method 280 may be the use of the reference pictures for the wide-area raw scores B and C. The method 280 generally uses pairs of the reference pictures to calculate the scores B and C. The method 160 may use the target picture and a respective reference picture to calculate the wide-area raw scores B and C. The respective reference pictures may be different than the reference picture used to calculate the wide-area raw score A.

The functions and structures illustrated in the diagrams of FIGS. 1-9 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for temporal filtering based on motion detection on areas of different sizes, comprising the steps of:
    computing a plurality of motion scores of a plurality of areas in a target picture in a sequence of pictures by motion detection of said areas between said target picture and a reference picture in said sequence of pictures, wherein said areas comprise at least two overlapping areas of different sizes;
    computing a combined motion score by combining said plurality of motion scores; and
    generating a filtered picture by temporal filtering said target picture with said reference picture based on said combined motion score, wherein at least one of (i) said motion scores and (ii) said filtered picture is based on one or more gain settings in a circuit.

2. The method according to claim 1, where (i) said combined motion score is controlled by one or more parameters and (ii) at least one of said parameters depends on at least one of said gain settings.

3. The method according to claim 1, further comprising the steps of:
    multiplying one of said motion scores by another of said motion scores to generate an index value; and
    reading said combined motion score from a lookup table indexed by said index value.

4. The method according to claim 1, further comprising the steps of:
    offsetting one of said motion scores with another of said motion scores to generate an index value; and
    reading said combined motion score from a lookup table indexed by said index value.

5. The method according to claim 1, further comprising the step of:
    transforming one of said motion scores based on another of said motion scores to generate said combined motion score.

6. The method according to claim 1, wherein (i) said plurality of areas is at least three areas and (ii) said plurality of motion scores is at least three motion scores.

7. The method according to claim 1, further comprising the step of:
    computing a large motion score by combining two or more of said motion scores computed from larger ones of said areas.

8. The method according to claim 7, wherein said combined motion score is generated based on said large motion score and one of said motion scores computed from a smaller one of said areas.

9. The method according to claim 1, wherein said circuit is part of a digital camera.

10. An apparatus comprising:
    an interface configured to receive a sequence of pictures; and
    a circuit configured to (i) compute a plurality of motion scores of a plurality of areas in a target picture in said sequence of pictures by motion detection of said areas between said target picture and a reference picture in said sequence of pictures, wherein said areas comprise at least two overlapping areas of different sizes, (ii) compute a combined motion score by combining said plurality of motion scores and (iii) generate a filter picture by filtering said target picture with said reference picture based on said combined motion score, wherein at least one of (a) said motion scores and (b) said filtered picture is based on one or more gain settings in said circuit.

11. The apparatus according to claim 10, where (i) said circuit is further configured to control said combined motion score by one or more parameters and (ii) at least one of said parameters depends on at least one of said gain settings.

12. The apparatus according to claim 10, wherein said circuit is further configured to (i) multiply one of said motion scores by another of said motion scores to generate an index value and (ii) read said combined motion score from a lookup table indexed by said index value.

13. The apparatus according to claim 10, wherein said circuit is further configured to (i) offset one of said motion scores with another of said motion scores to generate an index value and (ii) read said combined motion score from a lookup table indexed by said index value.

14. The apparatus according to claim 10, wherein said circuit is further configured to transform one of said motion scores based on another of said motion scores to generate said combined motion score.

15. The apparatus according to claim 10, wherein (i) said plurality of areas is at least three areas and (ii) said plurality of motion scores is at least three motion scores.

16. The apparatus according to claim 10, wherein said circuit is further configured to compute a large motion score by combining two or more of said motion scores computed from larger ones of said areas.

17. The apparatus according to claim 16, wherein said combined motion score is generated based on said large motion score and one of said motion scores computed from a smaller one of said areas.

18. The apparatus according to claim 10, wherein said interface and said circuit are part of a digital camera.

* * * * *